United States Patent
Ho et al.

(10) Patent No.: US 8,259,417 B1
(45) Date of Patent: Sep. 4, 2012

(54) DISK DRIVE HEAD STACK ASSEMBLY HAVING A FLEXIBLE PRINTED CIRCUIT WITH STIFFENER BEND AXIS NORMAL TO THE ACTUATOR PIVOT AXIS

(75) Inventors: Shufun Ho, Fremont, CA (US);
Yau-Shing Lee, Sunnyvale, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/163,387

(22) Filed: Jun. 17, 2011

(51) Int. Cl.
  *G11B 5/55* (2006.01)
(52) U.S. Cl. ............................ 360/245.9
(58) Field of Classification Search .............. 360/245.9
  See application file for complete search history.

(56) References Cited

U.S. PATENT DOCUMENTS

| | | | |
|---|---|---|---|
| 5,241,436 A * | 8/1993 | Kawabata et al. | 360/97.01 |
| 5,375,021 A | 12/1994 | Boeckner | |
| 5,818,667 A | 10/1998 | Larson | |
| 5,953,183 A | 9/1999 | Butler et al. | |
| 6,480,362 B1 | 11/2002 | Yoshida et al. | |
| 6,563,676 B1 | 5/2003 | Chew et al. | |
| 6,856,490 B2 | 2/2005 | Rosner et al. | |
| 6,865,055 B1 | 3/2005 | Ou-Yang et al. | |
| 6,934,126 B1 * | 8/2005 | Berding et al. | 360/264.2 |
| 7,227,725 B1 * | 6/2007 | Chang et al. | 360/264.2 |
| 7,271,345 B2 | 9/2007 | Freeman et al. | |
| 7,538,981 B1 | 5/2009 | Pan | |
| 7,616,408 B2 * | 11/2009 | Choi et al. | 360/264.2 |
| 7,787,219 B2 * | 8/2010 | Chan et al. | 360/265.7 |
| 7,869,164 B2 * | 1/2011 | Shin | 360/264.2 |
| 8,018,687 B1 * | 9/2011 | Little et al. | 360/264.2 |
| 2008/0171465 A1 | 7/2008 | Lauriano et al. | |
| 2008/0180854 A1 | 7/2008 | Chang et al. | |
| 2008/0247081 A1 | 10/2008 | Chang et al. | |
| 2008/0247094 A1 | 10/2008 | Chang et al. | |
| 2009/0141404 A1 | 6/2009 | Kerner et al. | |
| 2010/0027166 A1 | 2/2010 | Huang et al. | |
| 2010/0123976 A1 * | 5/2010 | Freeman et al. | 360/264.2 |

* cited by examiner

*Primary Examiner* — Mark Blouin

(57) ABSTRACT

A disk drive head stack assembly has a flexible printed circuit (FPC) including a flex cable and a flex stiffener. The flex stiffener includes a terminal region support portion that is attached to the actuator body, a flex cable guide portion, and a stiffener bend. The stiffener bend is between and connects the terminal region support portion and the flex cable guide portion. The flex cable includes a guided portion that is in contact with the flex cable guide portion. A flex cable terminal region is attached to the terminal region support portion. The stiffener bend is about a stiffener bend axis that is perpendicular to the actuator pivot axis.

16 Claims, 4 Drawing Sheets

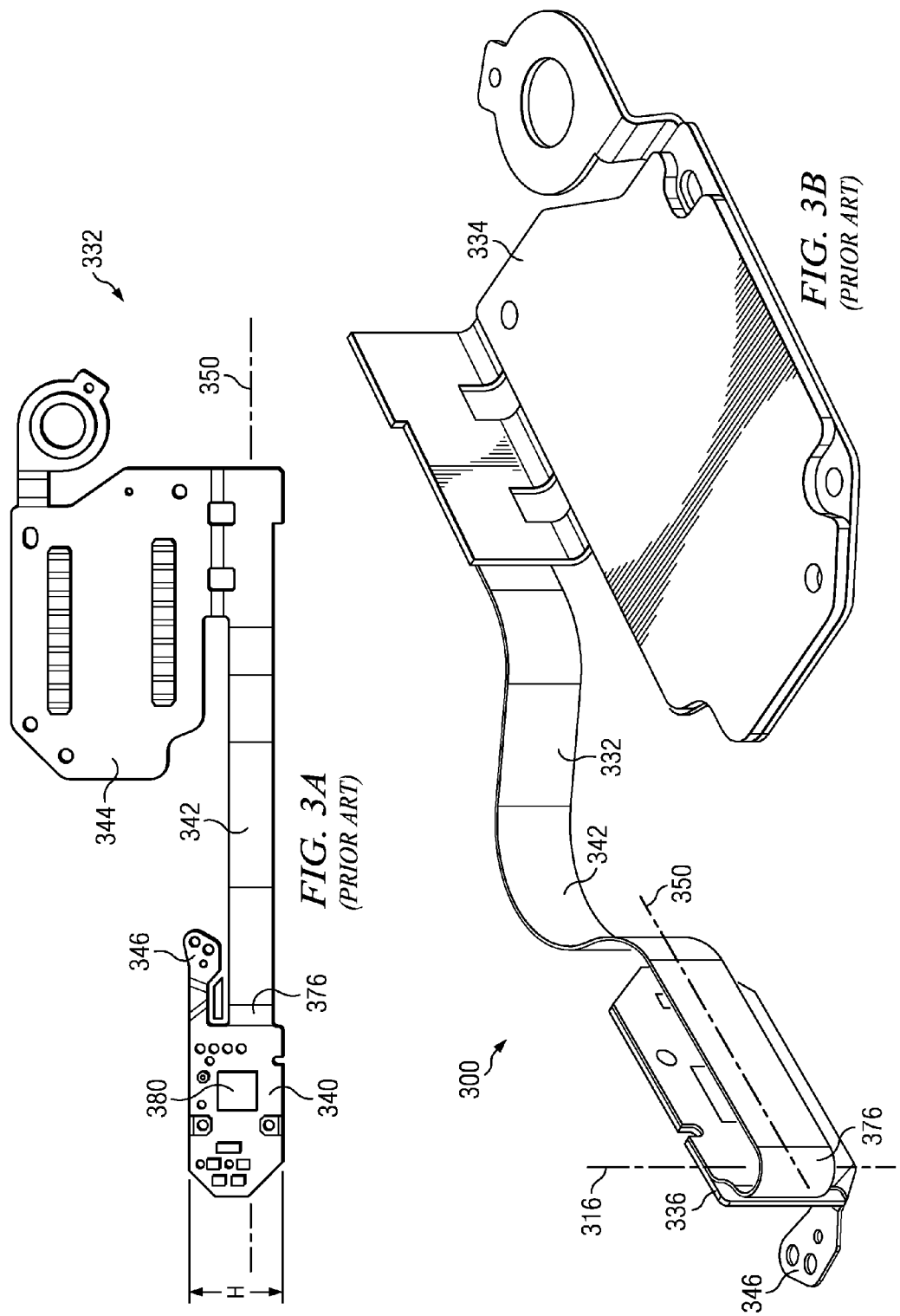

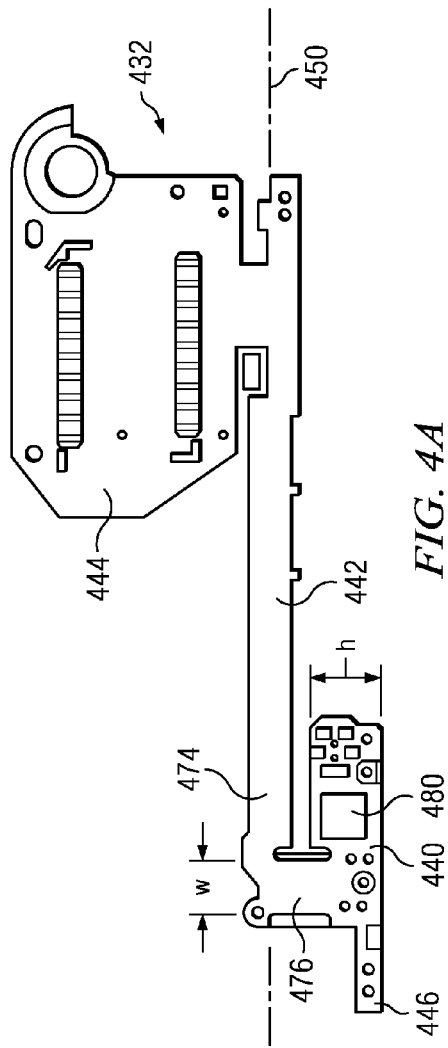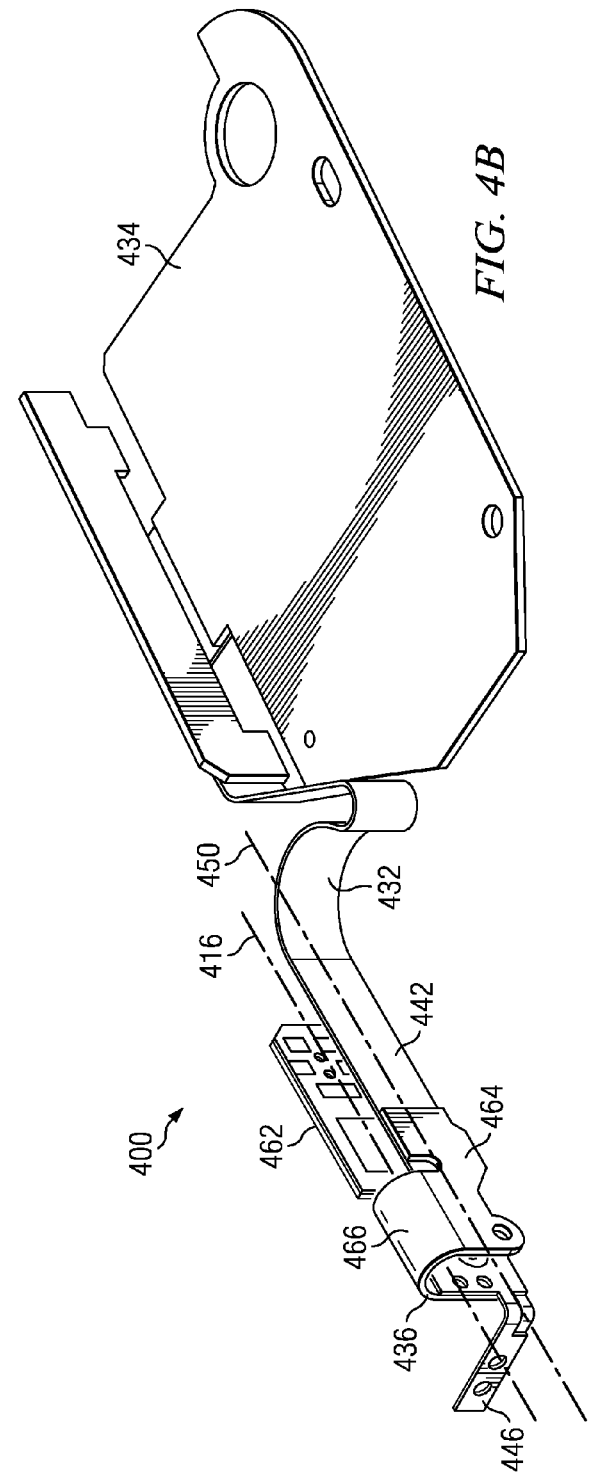

DISK DRIVE HEAD STACK ASSEMBLY HAVING A FLEXIBLE PRINTED CIRCUIT WITH STIFFENER BEND AXIS NORMAL TO THE ACTUATOR PIVOT AXIS

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For example, in an optical disk drive, the head will typically include a mirror and objective lens for reflecting and focusing a laser beam on to a surface of the disk. In magnetic recording applications, the head will typically include a transducer having an inductive writer and a magnetoresistive reader.

In a modern magnetic hard disk drive device, each head is a sub-component of a head gimbal assembly (HGA) that typically includes a suspension assembly with a laminated flexure to carry the electrical signals to and from the head. The HGA, in turn, is a sub-component of a head stack assembly (HSA) that typically includes a plurality of HGAs, an actuator, and a flexible printed circuit (FPC) that includes a flex cable. The plurality of HGAs are attached to various arms of the actuator, and each of the laminated flexures of the HGAs has a flexure tail that is electrically connected to the FPC of the HSA.

Modern laminated flexures typically include conductive copper traces that are isolated from a stainless steel structural layer by a polyimide dielectric layer. So that the signals from/to the head can reach the FPC at the actuator body, each HGA flexure includes a flexure tail that extends away from the head along the actuator arm and ultimately attaches to the FPC adjacent the actuator body. That is, the flexure includes traces that extend from adjacent the head and terminate at electrical connection points at a terminal region of the FPC.

The FPC includes electrical terminals that correspond to the electrical connection points of the flexure tails. The FPC also includes a flex cable that includes a number of electrical traces to be connected to the electrical traces of the flexure tails. The FPC electrical traces carry signals along the flex cable from/to a printed circuit board assembly (PCBA) to/from the heads, as the heads write and read information recorded in concentric circular tracks on the disks.

The flex cable is typically longer than the shortest length required to span the distance between the actuator assembly and the flex bracket, because it is not desired for the flex cable to constrain the angular range of motion of the actuator. The excess length in the flex cable forms a curve that allows the actuator assembly to be electrically coupled yet mechanically compliant to the applied torque (e.g. from a voice coil motor). Still, the flex cable exerts some biasing torque on the actuator, which must be overcome and compensated for by the voice coil motor.

The FPC may be designed to include a flex stiffener at the FPC termination region adjacent the actuator body, to support and facilitate attachment of the FPC terminal region to the actuator body, and to help set and control a desired exit angle θ of the flex cable from the actuator body. Typically, the flex stiffener causes a bend, between the flex cable and the FPC terminal region, that is about a bend axis that is parallel to the pivot axis of the actuator.

However, such flex stiffener designs may present challenges to realizing certain contemporary trends in disk drive technology: reducing the size of disk drives, and/or increasing the number of conductors per head. Specifically, the maximum height specified for modern disk drives may be considerably less than that specified for disk drive designs of the past. Such trend may conflict with another trend to embed more functionality within each read/write head, since doing so often requires more numerous electrical conductors to be connected to each read/write head. Having more numerous electrical conductors would tend to increase the height of the flex cable, and the FPC terminal region. Hence, there is a need in the art for a FPC design that can accommodate additional electrical conductors in the flex cable without excessive height in the FPC terminal region.

BRIEF DESCRIPTION OF THE DRAWINGS

FIG. 3A depicts a conventional flex cable, lying flat and unbent.

FIG. 3B depicts a conventional flexible printed circuit, with its flex cable held in a bent shape by a flex stiffener and flex cable bracket with which it is assembled.

FIG. 4A depicts a flex cable according to an embodiment of the present invention, lying flat and unbent.

FIG. 4B depicts a flexible printed circuit according to an embodiment of the present invention, with its flex cable held in a bent shape by a flex stiffener and a flex cable bracket with which it is assembled.

DETAILED DESCRIPTION OF EXAMPLE EMBODIMENTS

Figure 1:
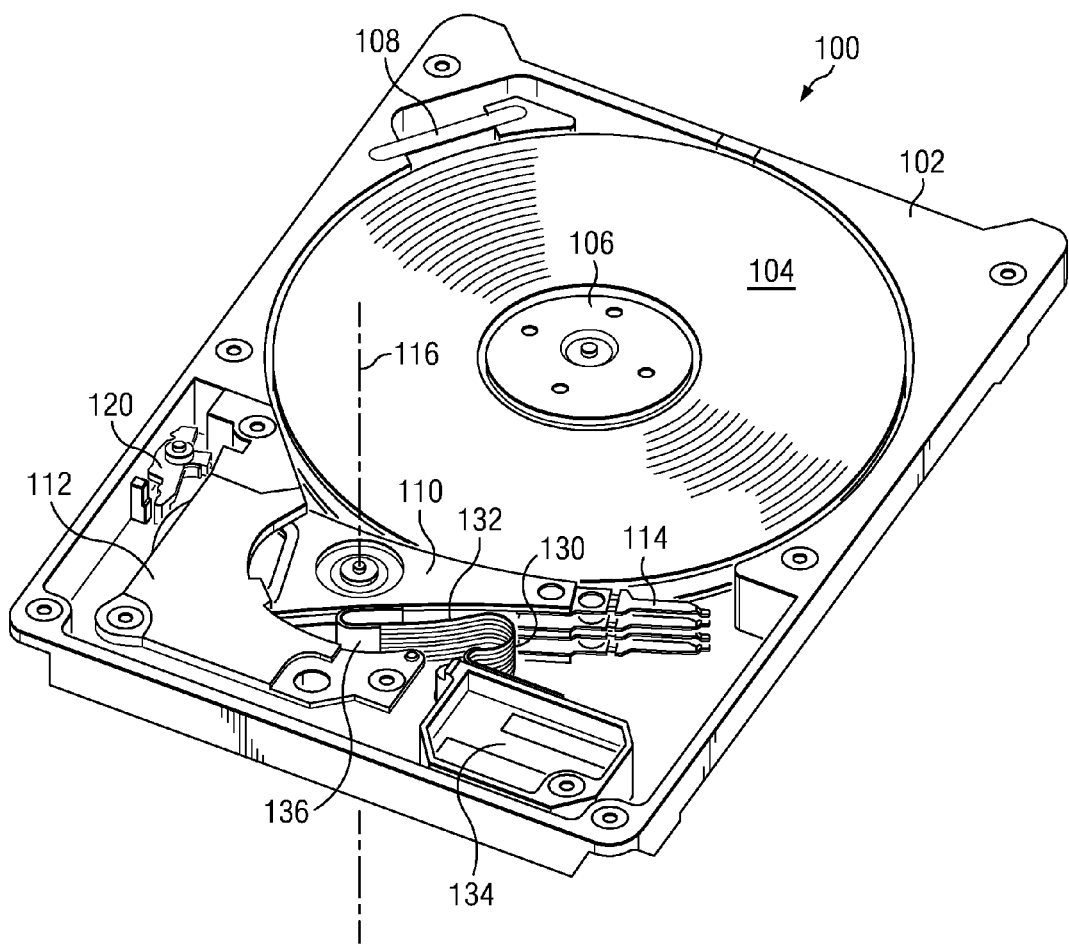
FIG. 1 is a perspective view of a conventional disk drive (without any cover shown so that interior parts may be viewed).
Figure 2:
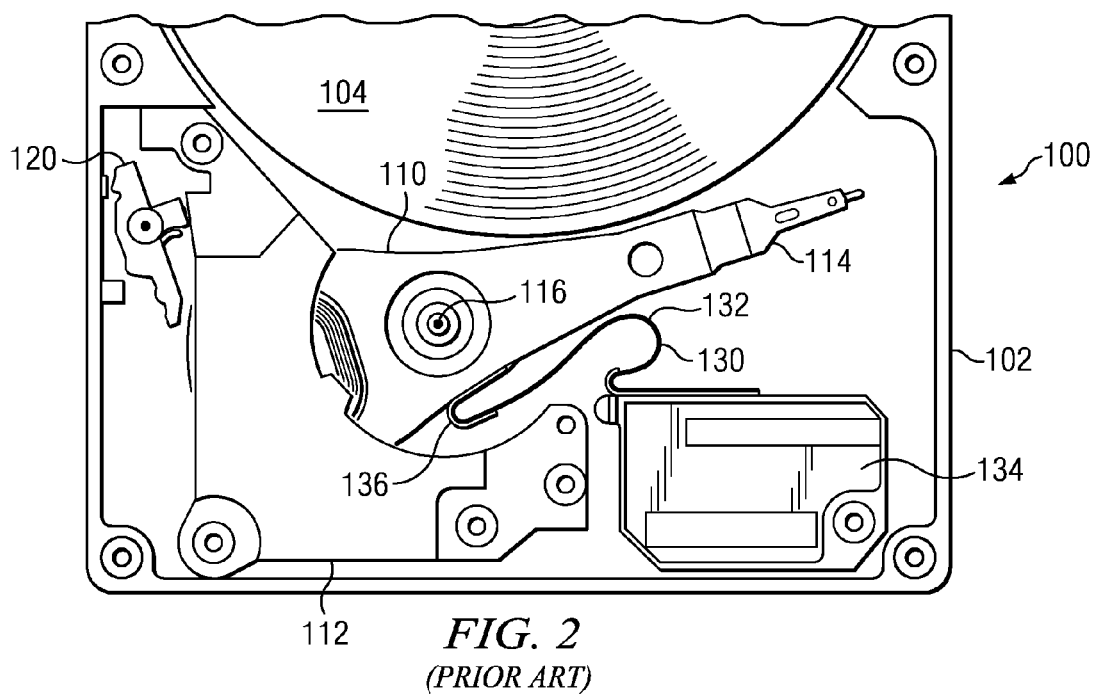
FIG. 2 is top view of a portion of the disk drive of FIG. 1.

FIG. 1 is top perspective view of a conventional disk drive 100, and FIG. 2 is a top view of a portion of the disk drive 100. The disk drive 100 includes a disk drive base 102 and two annular magnetic disks 104. The disks 104 include opposing disk surfaces which may include one or more magnetic layers. Data may be recorded along data tracks on a single disk surface or both. The disk drive 100 further includes a spindle 106, rotably mounted on the disk drive base 102, for rotating the disks 104. The rotation of the disks 104 establishes air flow through recirculation filter 108. Disk drives like disk drive 100 may have only a single disk, or alternatively, two or more disks.

The disk drive 100 further includes an actuator 110 that is pivotably mounted on the disk drive base 102. Voice coil motor 112 rotates the actuator 110 through a limited angular range about an actuator pivot axis 116, so that at least one head gimbal assembly (HGA) is desirably positioned relative to one or more tracks of information on a corresponding one of the disks 104. The actuator 110 may occasionally be latched at an extreme angular position within the limited angular range, by latch 120.

The disk drive of FIG. 1 includes four HGAs 114, each of which corresponds to a surface of one of the two disks 104. However fewer or more HGAs may be included depending on the number of disks 104 that are included and whether the disk drive 100 is depopulated. Each HGA 114 includes a read head (too small to be depicted in FIGS. 1 and 2) with a transducer for at least reading data from a disk surface. The transducer may include both a read element and a writer, but the term read head will be used herein to refer to any head that can read, even if it also performs other functions such as writing, air bearing modulation, microactuation, etc. In optical and magneto-optical recording applications, the head may also include an objective lens and an active or passive mechanism for controlling the separation of the objective lens from a disk surface of the disk 104.

Electrical signals to/from the HGAs 114 are carried to other drive electronics via a flexible printed circuit 130, which includes a flex cable 132, a flex cable bracket 134 that is attached to the disk drive base 102, and a flex stiffener 136 that is attached to the body of the actuator 110. The flex cable 132 runs from the actuator 110 to the flex cable bracket 134. The flex cable bracket 134 may include a connector protruding from its underside, to electrically couple the flex cable 132 to a printed circuit board attached to the underside of the disk drive base 102 outside the disk drive enclosure.

The flex bracket 134 is also attached to the disk drive base 102, within the disk drive enclosure. The connector of the flex cable bracket 134 passes through the disk drive base 102 and is sealed with the disk drive base 102 to prevent contamination from entering the disk drive 100. The flex stiffener 136 is shown in FIGS. 1 and 2 to include a stiffener bend about a stiffener bend axis that is parallel to the actuator pivot axis 116. Bending conventionally occurs about such axis because that may help the flex stiffener 136 control the exit angle of the flex cable 132 as it extends away from the flex stiffener 136.

FIG. 3A depicts a conventional flex cable 332, lying flat and unbent. FIG. 3B also depicts the conventional flex cable 332, except in FIG. 3B the conventional flex cable 332 is held in a bent shape by a flex stiffener 336 and a flex cable bracket 334, with which the flex cable 332 is assembled to form a flexible printed circuit (FPC) 300. Now referring to FIGS. 3A and 3B, the flex cable 332 includes a flex cable terminal region 340 that is attached to the flex stiffener 336, a flex cable free portion 342 that is not in contact with the flex stiffener 336, and a flex cable base portion 344 that is in contact with the flex cable bracket 334. The flex stiffener 336 may comprise polyimide, for example, because it does not include a bend. Note that the flex cable 332 is bent adjacent the flex stiffener 336, about a bend axis 316 that is perpendicular to the flex cable longitudinal axis 350 and parallel to the actuator pivot axis.

The conventional flex cable 332 also includes a pre-amplifier chip 380 and a coil service extension 346 that includes a first plurality of conductive traces to energize a coil of the voice coil motor (VCM). Within the flex cable 332, the first plurality of conductive traces that energize the VCM coil come from the free portion 342 at the right, but then double back toward the right into the coil service extension 346. Also within the flex cable 332, a second plurality of conductive traces that communicate with the heads extends to the left into the flex cable terminal region 340.

However, in the conventional flex cable 332, both pluralities of conductive traces must run side-by-side through a the free portion 342 and the neck portion 376, with the first plurality of conductive traces needing to double back to the right past the neck portion 376. Hence the height H of the flex cable terminal region 340 must be large enough to accommodate both the second plurality of conductive traces that communicate with the heads, and twice (because doubled back) the first plurality of conductive traces that energize the VCM coil. Therefore, the height H of the flex cable terminal region 340 may be too great for use in certain low-profile or small form-factor disk drive products, and the design of FPC 300 may not be practically permit reduction of the height H of the flex cable terminal region 340 to the extent necessary for use in such products.

FIG. 4A depicts a flex cable 432 according to an embodiment of the present invention, lying flat and unbent. FIG. 4B also depicts the flex cable 432, except in FIG. 4B the flex cable 432 is held in a bent shape by a flex stiffener 436 according to an embodiment of the present invention, and by a flex cable bracket 434, with which the flex cable 432 is assembled to form a flexible printed circuit (FPC) 400.

Now referring to FIGS. 4A and 4B, the flex stiffener 436 includes a terminal region support portion 462 that may be attached to the actuator body. The flex cable 432 includes a flex cable terminal region 440 that is attached to the terminal region support portion 462. The flex stiffener 436 also includes a flex cable guide portion 464 that is in contact with (and may optionally be attached to) a guided portion 474 of the flex cable 432. The flex cable 432 also includes a flex cable free portion 442 that is not in contact with the flex stiffener 436. The flex cable guide portion 464 of the flex stiffener 436 contacts and guides the guided portion 474 of the flex cable 432, and thereby sets and controls the exit angle of the free portion 442 of the flex cable 432, as it extends away from the flex stiffener 436. The long axis of the flex cable 432 at the guided portion 474 defines a flex cable longitudinal axis 450.

In the embodiment of FIGS. 4A and 4B, the flex stiffener 436 also includes a stiffener bend 466 between and connecting the terminal region support portion 462 and the flex cable guide portion 464. A neck portion 476 of the flex cable 432 optionally contacts and bends with the stiffener bend 466. In the embodiment of FIG. 4B, the stiffener bend 466 is about a stiffener bend axis 416 that is perpendicular to the actuator pivot axis, and that is parallel to the flex cable longitudinal axis 450. Although the stiffener bend 466 is shown in FIG. 4B to be 180° about the bend axis 416, in an alternative embodiment the stiffener bend 466 is preferably at least 150° about the bend axis 416.

In the embodiment of FIG. 4B, the terminal region support portion 462, the flex cable guide portion 464, and the stiffener bend 466, are preferably a single component having material continuity rather than being an assembly of subcomponents. An alternative embodiment where they form an assembly of subcomponents is less preferred because such alternative embodiment may be more expensive and requires administration of an inventory of a greater number of parts in the manufacturing environment. The flex stiffener 436 may comprise aluminum, polyimide, and/or stainless steel, among other suitable materials, but since it includes the stiffener bend 466, aluminum or stainless steel may be preferable over polyimide from a fabrication process perspective.

In the embodiment of FIG. 4B, FPC 400 includes a flex cable bracket 434 that is attached to the disk drive base. The flex cable 432 includes a flex cable base portion 444 that is in contact with the flex cable bracket 434, though the free portion 442 of the flex cable 432 is not in contact with the flex cable bracket 434. A connector of the flex cable bracket 434 (disposed under the flex cable bracket 434, and so not visible in the view of FIG. 4B) may pass through and seal with the disk drive base to prevent contamination from entering the disk drive. For example, the flex cable bracket 434 may comprise nylon, acetal resin plastic, polyetherimide, polycarbonate plastic, and/or liquid crystal polymer.

In the embodiment of FIG. 4A, the flex cable 432 also includes a coil service extension 446 that includes a first plurality of conductive traces to energize a coil of the voice coil motor (VCM). Within the flex cable 432, the first plurality of conductive traces that energize the VCM coil extends to the left into the coil service extension 446, while a second plurality of conductive traces that communicate with the heads extends to the right into the flex cable terminal region

440. However, both pluralities of conductive traces must run side-by-side through the neck portion 476.

Therefore, in the embodiment of FIGS. 4A and 4B, although the width w of the neck portion must accommodate both pluralities of traces, the height h of the flex cable terminal region 440 needs only accommodate the second plurality of conductive traces that communicate with the heads, and the height h of the flex cable terminal region 440 need not be increased by the first plurality of conductive traces that energize the VCM coil.

Hence, in the embodiment of FIGS. 4A and 4B, and considering a minimum dimension required to accommodate the conventional pre-amplifier chip 480, the required electrical conductors in the flex cable 432 may advantageously cause less or no increase to the height h of the flex cable terminal region 440. Thus, the height h of the flex cable terminal region 440 may be small enough for use in certain low-profile or small form-factor disk drive products. For example, the flex cable terminal region 440 may include at least 12 electrical terminals and yet define height h of the flex cable terminal region 440 in the range 4 mm to 5.5 mm. Such a range for h may allow the FPC 400 to be used in a disk drive having a drive form factor height that is no more than 7 mm.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base;
   a spindle motor attached to the disk drive base;
   at least one disk attached to the spindle motor;
   a head stack assembly rotably attached to the disk drive base about an actuator pivot axis, the head stack assembly including an actuator body, an actuator arm protruding from the actuator body, and at least one read head supported by the actuator arm;
   a voice coil motor (VCM) including a coil, wherein the VCM is capable of rotating the head stack assembly about the actuator pivot axis;
   a flexible printed circuit (FPC) including a flex cable and a flex stiffener;
   wherein the flex stiffener includes:
      a terminal region support portion that is attached to the actuator body;
      a flex cable guide portion; and
      a stiffener bend between and connecting the terminal region support portion and the flex cable guide portion;
   wherein the flex cable includes:
      a coil service extension for energizing the coil of the VCM;
      a flex cable terminal region that is attached to the terminal region support portion; and
      a guided portion that is in contact with the flex cable guide portion;
   wherein the stiffener bend is about a stiffener bend axis that is perpendicular to the actuator pivot axis;
   wherein the guided portion is located on a first side of the stiffener bend axis; and
   wherein the coil service extension and the flex cable terminal region are located on a second side of the stiffener bend axis that is opposite to the first side such that a height of the flex cable on the second side does not include a height of the guided portion.

2. The disk drive of claim 1 wherein the flex cable defines a flex cable longitudinal axis at the guided portion, and wherein the stiffener bend axis is parallel to the flex cable longitudinal axis.

3. The disk drive of claim 2 wherein the stiffener bend is at least 150° about the stiffener bend axis.

4. The disk drive of claim 1 wherein the flex cable guided portion is attached to the flex cable guide portion, and the flex cable includes a free portion that is not in contact with the flex cable guide portion.

5. The disk drive of claim 1 wherein the terminal region support portion, the flex cable guide portion, and the stiffener bend, are a single component having material continuity rather than being an assembly of subcomponents.

6. The disk drive of claim 1 wherein the flex stiffener comprises a metal selected from the group consisting of aluminum and stainless steel.

7. The disk drive of claim 1 wherein the flex cable terminal region includes at least 12 electrical terminals and defines a terminal region height in the range 4 mm to 5.5 mm.

8. The disk drive of claim 7 wherein the disk drive defines a disk drive form factor height that is no more than 7 mm.

9. The disk drive of claim 1 wherein the FPC further includes a flex cable bracket attached to the disk drive base, the flex cable being attached to the flex cable bracket.

10. A head stack assembly (HSA) comprising:
    an actuator body having a pivot bearing that defines an actuator pivot axis;
    an actuator arm protruding from the actuator body;
    at least one read head supported by the actuator arm; and
    a flexible printed circuit (FPC) including a flex cable and a flex stiffener;
    wherein the flex stiffener includes:
       a terminal region support portion that is attached to the actuator body;
       a flex cable guide portion; and
       a stiffener bend between and connecting the terminal region support portion and the flex cable guide portion;
    wherein the flex cable includes:
       a coil service extension for energizing a coil of a voice coil motor capable of rotating the HSA about the actuator pivot axis;
       a flex cable terminal region that is attached to the terminal region support portion; and
       a guided portion that is in contact with the flex cable guide portion;
    wherein the stiffener bend is about a stiffener bend axis that is perpendicular to the actuator pivot axis;
    wherein the guided portion is located on a first side of the stiffener bend axis; and
    wherein the coil service extension and the flex cable terminal region are located on a second side of the stiffener bend axis that is opposite to the first side such that a height of the flex cable on the second side does not include a height of the guided portion.

11. The HSA of claim 10 wherein the flex cable defines a flex cable longitudinal axis at the guided portion, and wherein the stiffener bend axis is parallel to the flex cable longitudinal axis.

12. The HSA of claim 10 wherein the stiffener bend is at least 150° about the stiffener bend axis.

13. The HSA of claim 10 wherein the flex cable guided portion is attached to the flex cable guide portion, and the flex cable includes a free portion that is not in contact with the flex cable guide portion.

14. The HSA of claim 10 wherein the terminal region support portion, the flex cable guide portion, and the stiffener bend, are a single component having material continuity rather than being an assembly of subcomponents.

15. The HSA of claim 10 wherein the flex stiffener comprises a metal selected from the group consisting of aluminum and stainless steel.

16. The HSA of claim 10 wherein the flex cable terminal region includes at least 12 electrical terminals and defines a terminal region height in the range 4 mm to 5.5 mm.

* * * * *